Oct. 26, 1937. E. D. LILJA 2,096,906
SPEED REDUCTION GEAR
Filed Oct. 15, 1934 2 Sheets-Sheet 1
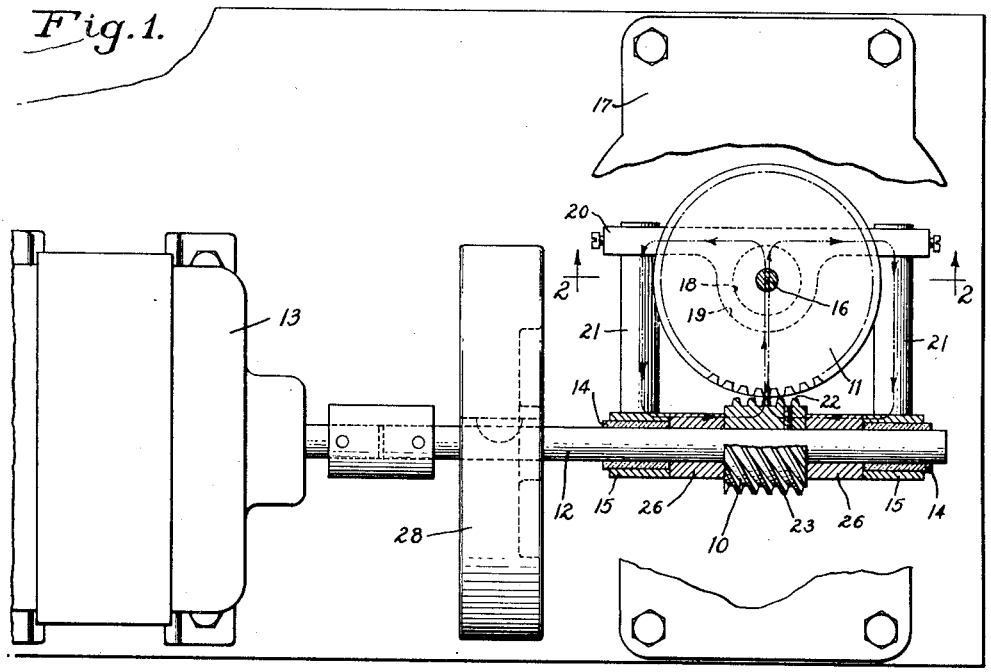
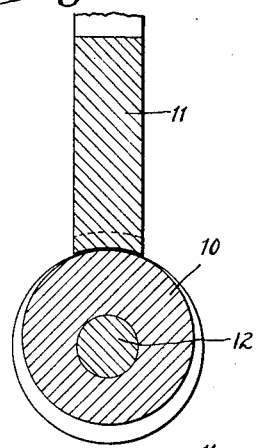
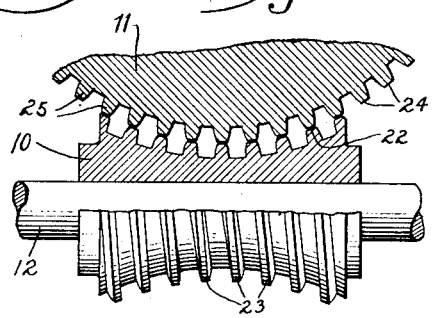
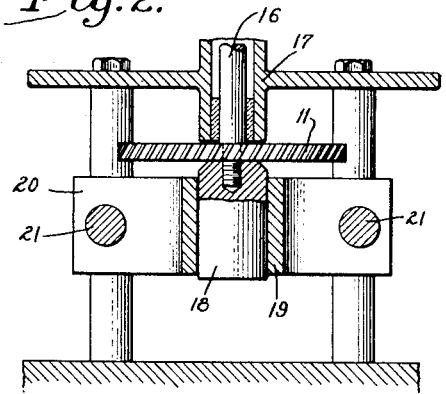
INVENTOR
Edgar D. Lilja
BY
ATTORNEYS Oct. 26, 1937.  E. D. LILJA  2,096,906
SPEED REDUCTION GEAR
Filed Oct. 15, 1934   2 Sheets-Sheet 2
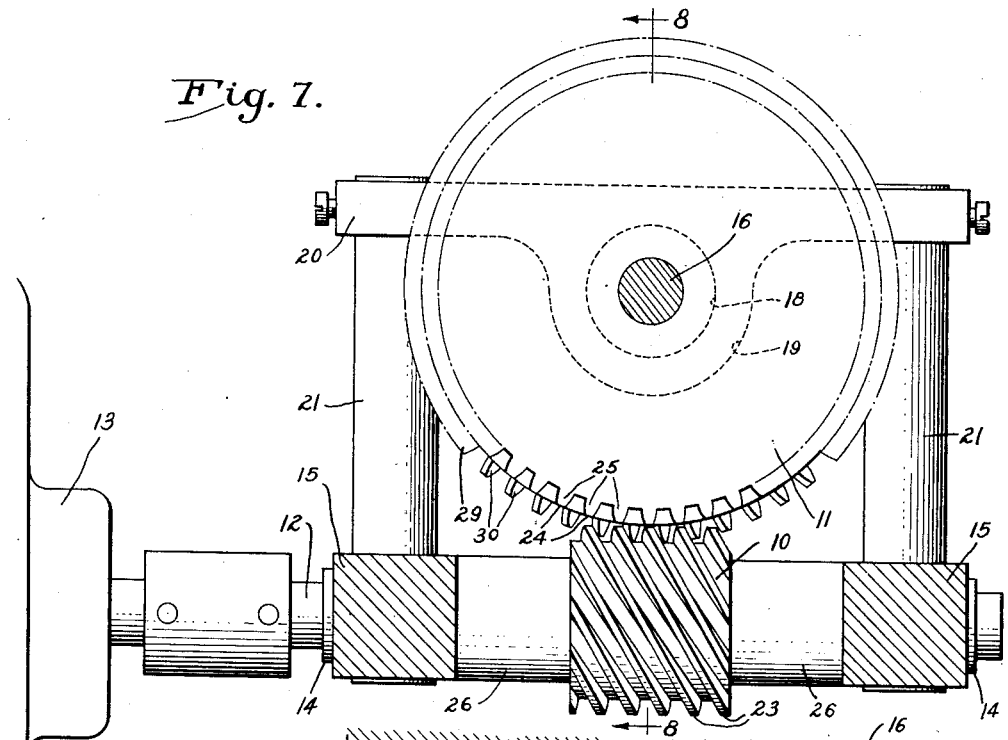
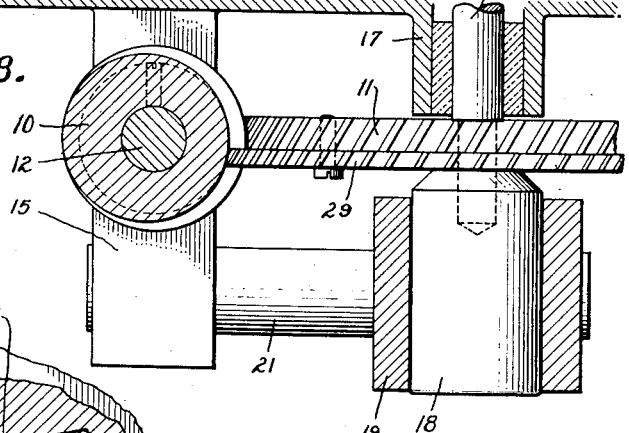
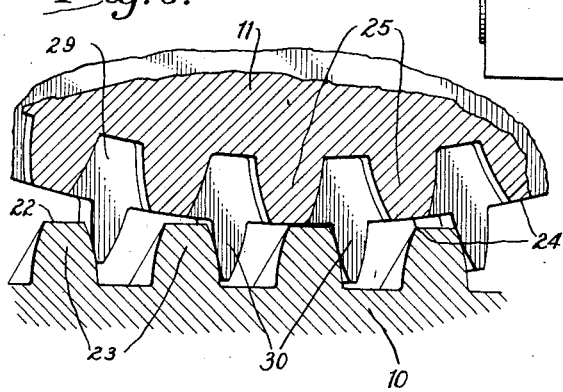
INVENTOR
*Edgar D. Lilja*
BY
ATTORNEYS Patented Oct. 26, 1937

2,096,906

UNITED STATES PATENT OFFICE 2,096,906

SPEED REDUCTION GEAR

Edgar D. Lilja, Rockford, Ill., assignor to Barber-Colman Company, Rockford, Ill., a corporation of Illinois Application October 15, 1934, Serial No. 748,296

9 Claims. (Cl. 172—284)

The primary object of the invention is to provide a speed reduction gearing which is silent and frictionless in operation, which requires no lubrication and which operates smoothly and without wear in spite of unavoidable irregularities in the coacting gear parts.

A more detailed object is to provide a speed reduction gearing of the worm type in which the transmission of motive power is effected without mechanical contact and by the force resulting from magnetic attraction between the coacting gears.

Another object is to provide in a gearing of the above character novel means for facilitating quick starting or maintaining the driving and driven parts in proper timed relation during the acceleration of the load.

The invention also resides in the novel character of the means for bringing the load up to its normal speed independently of the magnetic drive.

Other objects and advantages of the invention will become apparent from the following detailed description taken in connection with the accompanying drawings in which Figure 1 is a plan view partially in section of speed reduction gearing embodying the features of the present invention.

Fig. 2 is a section taken along the line 2—2 of Fig. 1.

Figs. 3 and 4 are elevational views of modified forms of the gearing.

Figs. 5 and 6 are enlarged fragmentary views of the coacting gear teeth.

Fig. 7 is a view similar to Figs. 1 and 2 illustrating a modified form of means for accelerating the load.

Fig. 8 is a fragmentary sectional view taken along the line 8—8 of Fig. 7.

Fig. 9 is a fragmentary sectional view taken through a plane of the worm gear shown in Fig. 7 and including the axis of the worm.

While the invention is susceptible of various modifications and alternative constructions, I have shown in the drawings and will herein describe in detail the preferred embodiments, but it is to be understood that I do not thereby intend to limit the invention to the specific form disclosed, but intend to cover all other modifications and alternative constructions falling within the spirit and scope of the invention as expressed in the appended claims.

The invention involves generally a worm 10 and a worm wheel or gear 11 magnetically energized and mounted with their axes in the conventional relation but spaced apart so that their peripheries will be disposed closely adjacent but out of mechanical engagement with each other. As a result of the magnetic attraction between the coacting teeth, a component force will be exerted in a tangential direction on the gear during rotation of the worm causing the gear to rotate at a speed determined by the number of gear teeth and the number of worm teeth passing the point of nearest approach per unit time.

The worm and the worm gear 11 are both formed of magnetic material. The worm is fast on a shaft 12 driven in any suitable way as by an electric motor 13. To provide for proper concentration of the magnetic flux in the coacting teeth of the gears, the shaft is preferably formed of non-magnetic material and journaled at spaced points in bearings 14 supported in blocks 15 of magnetic material.

In the form shown in Figs. 1 and 2, the worm wheel 11 is formed with straight spiral teeth and carried by a non-magnetic shaft 16 journaled in a non-magnetic bearing structure 17. Disposed closely adjacent the hub of the gear 11 is a stub shaft 18 of larger section composed of magnetic material journaled in a magnetic bearing 19 on a steel bar 20. At its opposite ends, the bar is apertured to receive the upper ends of two rods 21 the lower ends of which are received in the blocks 15. The rods may be formed of cobalt steel or other suitable material which may be permanently magnetized so as to constitute a constant source of magneto-motive force. The shafts extend transversely of each other and their bearings are so spaced that the end surfaces 22 of the worm threads 23 are spaced approximately .005 of an inch from the surfaces 24 of the gear teeth 25 at the closest point.

From the foregoing, it will be seen that there are two paths for the magnetic flux produced by the magnets 21. As shown by the arrows in Fig. 1, these extend from the gear, through the bar 20, the magnets 21, the blocks 15, iron spacer sleeves 26 to the worm 10. By virtue of the relatively large area of connected iron parts and the use of non-magnetic shafts, the magnetic paths are well defined and substantially closed resulting in the development of a strong field in the gap between the peripheries of the gears. The flux is most highly concentrated in the thread of the worm closest to a tooth of the gear, the concentration of flux decreasing toward the edges of the gear tooth owing to the curvature of the worm, where as in the form shown in Fig. 1, an ordinary spiral gear is used.

As a result of the strong attraction between the worm and gear teeth, the gear teeth will follow the worm threads and move longitudinally of the worm as the latter rotates, the active tooth of the gear tending to remain substantially in full register with the cooperating worm surface so that the direction of the flux lines and therefore the attractive force is substantially radial as indicated by the flux lines in Fig. 5. This condition will prevail when the driven gear is not loaded. As the load is increased, the active tooth surface 24 trails the coacting thread surface 22 resulting in a decrease in the total flux but an actual increase in the tangential component of the attractive force due to the fact that the flux lines between the coacting teeth are inclined further as indicated at Fig. 6. Thus, greater torque is exerted tending to maintain the gear in synchronism with the worm, the power which can be transmitted being limited by the torque required to pull the coacting teeth out of magnetic meshing relation.

Operation of the gearing in the manner above described effects a reduction in speed determined by the number of gear teeth and the number of threads in the worm. While the power which can be transmitted is only a part of that which could be obtained by mechanical means, it has been found that the torque obtained is sufficient for many purposes so that the gearing has substantial utility for applications where a silent and frictionless drive is required and where it is desirable to avoid the necessity of lubricating coacting gear surfaces. Another advantage of the gearing resides in the fact that the uniformity of the movement of the driven member is not affected by unavoidable inaccuracies in the gears. Since there is no mechanical contact between the gear teeth, the only effect of such inaccuracy is to vary the total flux threading the gear surfaces which does not disturb the timed relation of the driving and driven shafts.

Where, as in the form shown in Fig. 1, the gear 11 is of the so-called spiral type, the opposed surfaces of coacting teeth are not, due to the curvature of the worm, equally spaced throughout the width of the gear. If desired, this condition may be overcome through the use of the conventional throat cut construction wherein the surfaces of the gear teeth are of concave curvature corresponding to that of the worm as shown in Fig. 3. The torque applied to the gear 11 may be increased substantially by thus reducing the effective width of the air gap between the active teeth. If a still further increase in torque is desired, this may be attained by utilizing a worm of the so-called Hindley type as shown in Fig. 4. In this construction, the longitudinal section of the worm is made concave so as to conform to the curvature of the gear periphery. With this arrangement, the number of gear teeth in coacting relation with the worm thread is increased substantially. The radius of throat curvature of the gear is of course made equal to the average worm radius so as to maintain the air gap between the mating elements of the worm and gear teeth substantially uniform at all points of proximity.

Where the driven member is connected to a load having high inertia or a frictional resistance approximating the maximum capable of being overcome by the magnetic gearing, it is desirable to provide means for limiting the rate of acceleration of the driving shaft during starting so as to prevent the gears from getting out of step. This means may take the form of an inertia wheel 28 carried by the driving shaft 12 as shown in Fig. 1, and operating to prevent acceleration of the drive shaft at a greater rate than the driven shaft may be accelerated under the torque of the magnetic coupling.

In some cases, it may be desirable to start and bring the driven shaft rapidly up to its operating speed. To this end, the driving and driven shafts are arranged to be connected mechanically by means which become ineffective automatically when the normal operating speed has been attained. In the form shown in Figs. 7 to 9, this connection is formed by an auxiliary spiral gear 29 composed of non-magnetic material and mounted on the driven shaft preferably adjacent the gear 11. This gear is of larger diameter than the magnetic gear so that its teeth 30 project into the worm grooves. The teeth are substantially narrower than the grooves and are offset behind the teeth 25 so as to allow for some degree of independent relative movement between driving and driven shafts. In this way, the teeth 30 float between the threads 23 when the driven member has been brought up to speed and the load overcome by the power transmitted through the medium of the magnetic coupling.

The action of the gears during starting of the device is shown in Fig. 9 wherein the worm 10 is assumed to be turning so that the surfaces 22 which are presented to the surfaces 24 are being advanced toward the right. When the motor is started, the teeth 23 and 30 will be in mechanical engagement as shown. After the respective parts have come up to speed mechanically, the inertia forces are eliminated, and there will remain only the frictional load which can be overcome by the magnetic action between the teeth 23 and 25. The gear 11 will then advance with respect to the worm 10 until the displacement between the teeth 23 and 25 is just sufficient to supply the necessary torque. At this stage in the operation, the teeth 30 will be disposed between and out of engagement with the worm threads 23. Except for the slight noise and wear at starting, this arrangement has all the advantageous features of the form of drive hereinbefore described in connection with Figs. 1 to 3.

I claim as my invention:

1. Speed reduction gearing comprising, a nonmagnetic shaft, a worm of magnetic material fast on said shaft, a block of magnetic material providing a bearing support for said shaft, a magnetic sleeve on said shaft providing a closed magnetic path between said worm and said block, a worm gear composed of magnetic material and mounted with its teeth disposed closely adjacent the periphery of said worm, and non-rotatable means providing a substantially closed magnetic circuit between said block and said gear.

2. Speed reduction gearing comprising, a driving worm, a coacting worm gear mounted with its axis extending transversely of the worm axis and its teeth disposed adjacent but out of engagement with the worm periphery, said worm and gear being composed of magnetic material and magnetically energized to produce magnetic attraction between the opposed tip surfaces of the adjacent gear teeth and worm threads, and a second worm gear of non-magnetic material mounted for rotation with said first mentioned gear and having teeth disposed in meshing relation to the worm threads but of substantially narrower width than the worm grooves whereby to remain out of engagement with the worm during normal register of the worm threads and the teeth of said first mentioned gear.

3. Speed reduction gearing comprising, rotatable driving and driven shafts, magnetically energized gears thereon mounted with the tips of their adjacent peripheral teeth adapted to attract each other magnetically whereby to cause rotation of the gears in a predetermined relation, said gears being positioned with the addendum circles of said teeth disposed in non-intersecting relation, and normally inactive means providing a positive driving connection between said shafts when said gears are moved relative to each other out of said relation.

4. A drive mechanism comprising rotary driving and driven members magnetically energized and having opposed projections radially spaced apart and movable in non-intersecting paths, said projections coacting magnetically to maintain a predetermined driving relation between said members, and means adapted to provide a positive drive between said members but constructed to permit a limited degree of independent rotary motion between the members, said last mentioned means remaining ineffectual during normal operation of the magnetic drive.

5. The combination with an electric motor of a worm and worm wheel composed of magnetic material and mounted with their peripheries disposed closely adjacent but out of mechanical engagement with each other, means for energizing said worm and worm wheel to cause the latter to be driven magnetically during rotation of the worm, and means including an inertia wheel associated with said worm for limiting the rate of acceleration of the worm to a rate less than that at which said wheel may be accelerated by the magnetic torque exerted thereon by said worm.

6. In a drive mechanism, a driven shaft and a worm on said shaft, a helical gear assembly including teeth narrower than the threads of said worm and adapted to mechanically mesh therewith, other teeth on said gear assembly of a width similar to that of said worm threads but spaced radially therefrom, and means creating magnetic flux threading through said worm and said gear assembly, said mechanically meshing gear teeth being in contact with said worm threads during initial rotational movement of the worm until the starting inertia has been overcome and said magnetic flux becomes operative to maintain the spaced worm threads and gear teeth substantially in registry.

7. The combination with a rotary driving member of a worm rotatable with said member and composed of magnetic material, a worm wheel mounted with its periphery disposed closely adjacent but out of mechanical engagement with the threads of said worm, means for energizing said worm and worm wheel to cause the latter to be driven magnetically during the rotation of the worm, and means including an energy absorbing device interposed between said worm and said driving member for limiting the rate of acceleration of the worm by said member to a rate less than that at which said wheel may be accelerated by the magnetic torque exerted thereon by said worm.

8. A drive mechanism comprising rotary driving and driven members magnetically energized and having opposed magnetic projections radially spaced apart and movable in non-intersecting paths, said projections coacting magnetically to maintain a predetermined driving relation between said members, and non-magnetic projections arranged in alinement with the interdental spaces between said magnetic projections on one of said members and mounted for rotation with said one member, said non-magnetic projections being substantially narrower in width than the interdental spaces on the other of said members and movable in a path intersecting the path of movement of said magnetic projections on said other member whereby said non-magnetic projections remain out of engagement with said magnetic projections on said other member during the normal register of the magnetic projections on said members.

9. A drive mechanism comprising rotary driving and driven members magnetically energized and having opposed projections disposed out of mechanically meshing relation and coacting magnetically to maintain a predetermined driving relation between said members, and means associated with said driving member for limiting the rate of acceleration thereof to a rate less than that at which said driven member may be accelerated by the magnetic torque exerted thereon by said driving member.

EDGAR D. LILJA.